June 29, 1965     T. MONNIN     3,191,647

SCREWDRIVER

Filed Jan. 24, 1962

INVENTOR
Théo Monnin
BY
Edward J. Connors
ATTORNEY.

3,191,647
SCREWDRIVER
Théo Monnin, Neuchatel, Switzerland, assignor to
Ebauches S.A., Neuchatel, Switzerland
Filed Jan. 24, 1962, Ser. No. 168,394
Claims priority, application Switzerland, Feb. 4, 1961,
1,274/61
5 Claims. (Cl. 144—32)

The invention concerns a screwdriver and more particularly an automatic screwdriver having a permanently rotating driveshaft and a drivenshaft connected with a screwdriver blade.

The screwdriver according to the invention is particularly distinguished by the combination of a double coupling between the driveshaft and the drivenshaft, and of a device for limiting the screw-in effect onto the screw, wherein the first coupling comprises a friction connection for taking along the drivenshaft at a small torque, and wherein the second coupling is constituted by cooperating means of the driveshaft and of the drivenshaft, these means, on the second coupling being engaged, providing for a positive drive of the drivenshaft as long as the device for limiting the screw-in effect is out of operation.

The accompanying drawing illustrates, by way of examples, two embodiments of the screw driver according to the invention.

Figure 1:
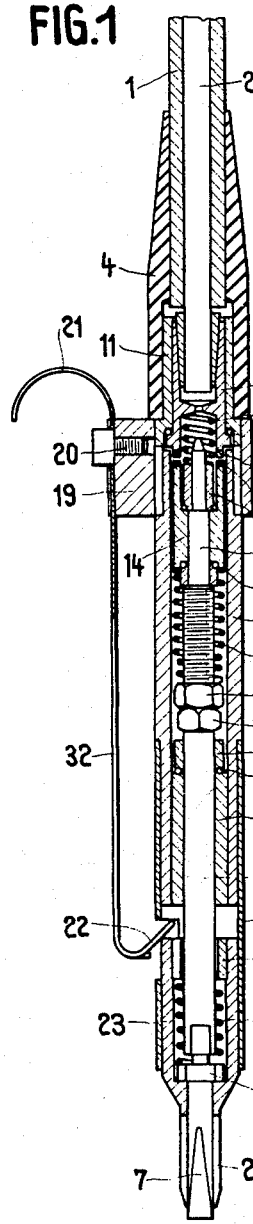
FIG. 1 is a partially sectional elevation of the first embodiment.
Figure 2:
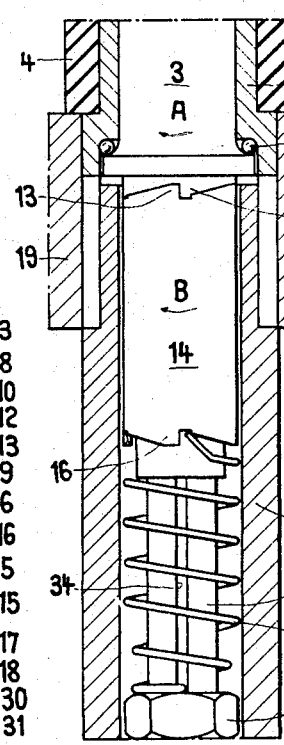
FIGS. 2 and 3 are sectional views on a larger scale and illustrate in details of FIG. 1.
Figure 3:
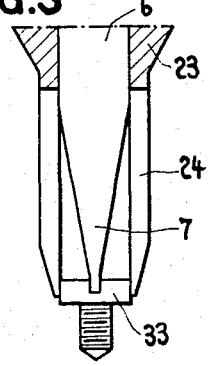

The embodiment as illustrated in FIGS. 1 to 3 is a hand screwdriver, adapted to be power driven by a motor (not shown) by means of a flexible cable whose shell 1 surrounds a member 2 which constitutes the driveshaft for the screwdriver, and during service of the latter, rotates without interruption. The member 2 carries an entrainer sleeve 3 forced onto the free end of the member 2. A socket 4 is fixed to the end of the shell 1 and is rigidly connected with a handle 5 for manipulation of the screwdriver. A shaft 6 rotated by the shaft 2 is rotatably mounted in the interior of the handle 5 and carries a screwdriver blade 7 on the end away from the cable 1, 2.

The shafts 2 and 6 are coupled with each other by means of two couplings. The one of these couplings is constituted by a helical spring 8 which is disposed in a bore of the entrainer sleeve 3 and one end of which is supported on the bottom of the said bore and the other end of a ring or collar 9 forced onto the shaft 6.

The entrainer sleeve 3 is rotatably mounted by means of a ball bearing 10 on a fixed sleeve 11 forced into the socket 4 and rigidly connected with the handle 5. On its lower portion, the entrainer sleeve 3 is provided with a crown or face toothing 12 with unilaterally sloping teeth (FIG. 2) provided to cooperate in the manner of a clutch with a crown or face toothing 13 with unilaterally sloping teeth of a bushing 14 freely mounted on the drivenshaft 6. In the position shown in FIG. 1, the clutch 12, 13 is disengaged while in FIG. 2 it is shown in engaged condition. A helical spring 15, stronger than the helical spring 8, surrounds the shaft 6 and is supported by its one end on a crown or face toothing 16 of the bushing 14 and by its other end on a nut or abutment 17 screwed onto the shaft 6 and secured by a lock nut 18.

A stirrup 21 is fixed by means of a screw 20 to a boss 19 mounted on the fixed sleeve 11, the stirrup 21 serving to suspend the screw driver on a support such as, for instance, on a hook. A bar 32 integral with the stirrup 21 (FIG. 1) ends in a curved portion 22 which cooperates with a sleeve 23 having a clamping collect 24 surrounding the blade 7. A helical spring 25 contained in the sleeve 23 bears by its one end against a collar 26 of the shaft 6 and by its other end on a ring 27 in fixed connection with the sleeve 23. A sleeve 28 is fixed to the inside of the handle 5. A shield tube 29 surrounds the sleeve 23 and a portion of the handle 5. A ring 30 forced onto the shaft 6 beneath the lock nut 18 is supported on the sleeve 28 by means of a ball bearing 31.

The above-described screwdriver as illustrated in FIGS. 1 to 3 works as follows:

The uninterruptedly rotating entrainer sleeve 3 drives by friction the helical spring 8 which acts onto the ring 9 so that the shaft 6 rotates under the influence of a small torque.

At the beginning of a screwing operation the bar 32 of the stirrup 21 is manually pressed towards the right (FIG. 1) so that the curved portion 22 of the bar 32 pushes the sleeve 23 together with the collet 24 against the constraint of the spring 25 forward (towards the bottom of FIG. 1). The collet 24 seizes a screw 33, for instance from a magazine (not shown) so that the screw can now be brought in front of the threaded hole into which it is to be screwed. The screwdriver blade 7 is still in retracted position within the collet 24 so that it does not yet enter the slot of the screw 33. Then the bar 32 is released so that under the effect of its proper elasticity it goes back to occupy its original position and the compressed spring 25 moves the sleeve 23 upwards (FIG. 1). Now the screwdriver blade 7 projects from the collet 24 and can enter the slot of the screw 33 (FIG. 3). This is obtained without any risk of damaging the head of the screw because the shaft 6 is rotated by means of the relatively small power occurring from the spring 8.

At this moment, the real screw-in operation may begin. For this purpose the screwdriver is axially pressed by hand towards the screw 33. The reaction exerted thereby by the screw 33 acts on the shaft 6 and pushes it back against the constraint of the spring 8 so that the clutch 12, 13 is getting engaged. The direction of rotation of the entrainer sleeve 3 is indicated by the arrow A in FIG. 2. The clutch 12, 13 effects a positive drive of the bushing 14 in the same direction of rotation (arrow B in FIG. 2). The bushing 14, in its turn, takes along the shaft 6 and the blade 7 by means of the relatively strong spring 15 engaging the crown or face toothing 16 of the bushing 14. For this reason and since a bent end of the spring 15 engages a groove 34 of the shaft 6 the latter is driven by a relatively great torque and effects the screwing-in of the screw 33 to the desired degree. As soon as the determined screw-in resistance is reached, i.e., as soon as the screw-in operation is completed, the upper end of the spring 15 jumps over the toothing 16 of the bushing 14 and the shaft 6 comes to rest. For modifying the tightening degree of the screw 33 the tension of the spring 15 can be changed by adjusting the nuts 17 and 18.

The screw 33 once screwed-in, the worker allows the screwdriver to move back so that the spring 8 is relieved and pushes the shaft 6 toward the bottom (FIG. 1) whereby the clutch 12, 13 is disengaged. The screwdriver blade 7, due to its engagement in the slot of the screw 33, is prevented from rotating and moves axially back together with the shaft 6. At the moment when the blade 7 leaves the slot of the screw 33, i.e., when a reaction is no longer exerted on the blade 7, the clutch 12, 13 is disengaged so that the blade 7 is now only under the influence of the small torque of the spring 8 and any damage to the slot and the head of the screw is, therefore, prevented.

The cycle is completed and another screw-in operation may begin.

Figure 4:
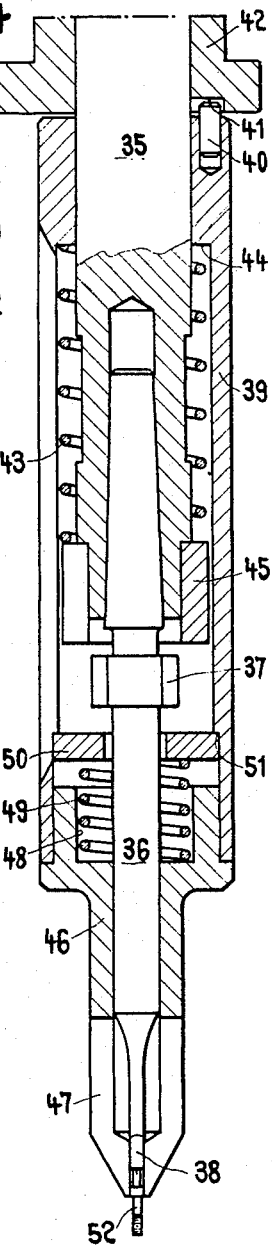
FIG. 4 is a partially sectional elevation, on a larger scale, of a portion of the second embodiment.

FIG. 4 shows the lower portion of the second embodiment in which the axial movement of the screwdriver for executing a screw-in operation is not effected by hand but is automatically controlled.

This second embodiment is similar to the first example as regards the upper portion, i.e., the couplings 8 and 12, 13 and the torque limiter 15, but differs from the first example with regard to the control of the axial displacement of the screwdriver.

The drivershaft 35 of the screwdriver has on its free end a rod 36 provided with a collar 37, the rod 36 ending in a screwdriver blade 38. A sleeve 39 corresponding to the sleeve 23 of the first embodiment is loosely mounted on the shaft 35 and carries on its upper face a pin 40 with its axis parallel to the shaft 35. The pin 40 is provided to cooperate with a dead hole 41 of the lower face of a control member 42 reciprocatingly mounted in axial direction on the shaft 35. A helical spring 43, whose one end is supported on a shoulder 44 of the sleeve 39 and the other end on a ring 45 forced onto the shaft 35, tends to move the sleeve 39 towards the top (FIG. 4). A socket 46 provided with a clamping collet 47 is fixed to the lower end of the sleeve 39. In a bore 48 of the socket 46 there is a helical spring 49 which is stronger than the spring 43. The spring 49 is supported on the bottom of the hole 48 and acts on a disc 50 in the sleeve 39 to move to and fro. The upward movement of the disc 50 is limited by a shoulder 51 of the sleeve 39. The rod 36 traverses with play a hole of the disc 50.

The embodiment illustrated in FIG. 4 works as follows:

At the beginning of the operation the control member 42 is in its upper position (not shown), the disc 50 bears against the collar 37 in a manner not shown and the pin 40 does not engage the hole 41 of the member 42. The sleeve 39 rotates together with the shaft 35 due to friction effect. The screwdriver blade 38 projects from the collet 47.

The control member 42 is operated by an automatic control device not shown. This device may, for instance, comprise a double-lever, the forked end of one arm of which is supported on the upper face of the member 42 and the free end of the other arm of which is, under the constraint of a spring and by means of a roller, in contact with a cam disc (not shown) mounted on a control shaft (not shown).

Under the effect of the said automatic control device the control member 42 moves towards the bottom of FIG. 4 so that pin 40 and hole 41 come into engagement with each other whereby the sleeve 39 is secured against rotation. The downward movement of the control member 42 continues so that also the sleeve 39 is displaced towards the bottom while the screwdriver shaft 35, 36 is at rest in axial direction. In consequence, the collet 47 is moved forward relatively to the screwdriver blade 38 to receive a screw 52 which is, for instance, stored in a magazine or the like. Afterwards, the control member 42, under the influence of the said control device and of a return spring not shown or a positive engagement between member 42 and said double-lever moves upwards followed by the sleeve 39 under the constraint of the spring 43, while the pin 40 remains engaged in the hole 41 of the member 42. During this movement, the screwdriver blade 38, rotated by the spring 8 with a small torque as in the first embodiment, moves forward relatively to the collet 47 and finds and enters the slot of the screw 52. At the same time, the shaft 35 in connection with a return spring (not shown) is moved downward by a separate control device (not shown) and the screw 52 is inserted into the threaded hole of the workpiece to be screwed.

The said separate control device may comprise a double-lever mounted on the same shaft as the double-lever of the first mentioned automatic control device, the one end of the said double-lever resting on the upper face (not shown) of the shaft 35 and the end of the other arm being, under the constraint of a spring (not shown), in contact with a cam disc mounted on the same control-shaft as the cam disc of the first-mentioned automatic control device.

The reaction exerted by the screw 52 causes the engagement of the clutch 12, 13 (FIGS. 1 to 3) and thereby the rotation of the shaft 35 at a relatively great torque. Therefore, the screw 52 is screwed into the hole.

During tightening the screw 52, the member 42 is not subjected to the downward movement of the shaft 35. The set constituted of the parts 39, 46, 47, 50 has a large freedom of movement allowing countersunk screws to be easily screwed into a workpiece. On the screw being brought to the place where it is to be screwed-in, the end of the collet 47 is supported on the border of the hole receiving the screw, whereby the collet comes to rest. On screwing-in, the screw is displaced relatively to the collet which remains supported. The collar 37 moves downward and gets into contact with the disc 50. Should this distance not be sufficient to tighten the screw, for instance, in the case of a countersunk screw, the disc 50 can now be displaced until it strikes against the socket 46, so that an additional path is given to the screwdriver blade 38. Therefore, the disc 50 constitutes an idle motion-limiter of the collet unit, that is, the disc 50 prevents the screwdriver blade 38 from projecting too much out of the collet 47. The disc 50 also constitutes a path limiter for the mechanical control device of the collet.

Once the screw 52 being tightened to the desired degree due to the torque limiter 15, the first-mentioned automatic control device provides for the member 42 moving towards the top and the spring 8 is again released and disengages the clutch 12, 13.

The screwdriver blade 38 subjected to a small torque leaves the slot of the screw 52 without damaging the latter. Another cycle may begin.

I claim:

1. A tool comprising a housing, a drive member, an axially movable tool holding driven member movable inwardly and outwardly of the housing, a collar at the end of the driven member adjacent the drive member, a clutch member freely mounted on the driven member, a first spring interposed between the drive member and the collar urging the driven member outwardly providing driving action therebetween and adapted to slip for a torque load above a predetermined value thereby providing a screw-slot engagement torque of low value, a clutch surface on the drive member, a first clutch surface on the clutch member adapted to cooperate with the clutch surface on the drive member, a second clutch surface on the back of the clutch member, an abutment on the driven member, a second spring interposed between the abutment and the clutch member second clutch surface to provide for jump engagement of the clutch member surface with the second spring and to urge the clutch member against the collar, and means fixedly engaging one end of the second spring with the driven member, the second spring being of greater compressive strength than said first spring so that when the driven member is moved inwardly the other end of the second spring exerts a force against said clutch member second clutch surface thereby axially moving the clutch member against the engaging force of the first spring in order that the cooperating clutch surfaces of the clutch member and drive member become engaged thereby providing a screw-in torque releasable at a higher value than said screw-slot engagement torque provided by the clutch member second clutch surface jumping on the second spring, the second spring being ineffective against the clutch member when the driven member is moved outwardly thereby allowing the first spring to release the engagement of the clutch surface on the drive member with the first clutch surface on the clutch member.

2. A tool comprising a housing, a drive member, an axially movable tool holding driven member movable inwardly and outwardly of the housing, a collar at the end of the driven member adjacent the drive member, a clutch member freely mounted on the driven member, a first spring interposed between the drive member and the collar urging the driven member outwardly providing driving action therebetween and adapted to slip for a torque load above a predetermined value thereby providing a screw-slot engagement torque of low value, a clutch surface on the drive member, a first clutch surface on the clutch member adapted to cooperate with the clutch surface on the drive member, a second clutch surface on the back of the clutch member, adjustable abutment means on the driven member, a second spring interposed between the adjustable abutment means and the clutch member second clutch surface to provide for jump engagement of the clutch member with the second spring and to urge the clutch member against the collar, and means fixedly engaging one end of the second spring with the driven member, the second spring being of greater compressive strength than said first spring so that when the driven member is moved inwardly the other end of the second spring exerts a force against said clutch member second clutch surface thereby axially moving the clutch member against the engaging force of the first spring in order that the cooperating clutch surfaces of the clutch member and drive member become engaged thereby providing a screw-in torque releasable at a higher value than said screw-slot engagement torque provided by the clutch member second clutch surface jumping on the second spring, the second spring being ineffective against the clutch member when the driven member is moved outwardly thereby allowing the first spring to release the engagement of the clutch surface on the drive member with the first clutch surface on the clutch member, the adjustable abutment means being variable to predetermine the release torque of the tool.

3. A tool comprising a housing, a drive member, an axially movable tool holding driven member movable inwardly and outwardly of the housing, a collar at the end of the driven member adjacent the drive member, a first spring interposed between the drive member and the collar urging the driven member outwardly providing driving action therebetween and adapted to slip for a torque load above a predetermined value thereby providing a screw-slot engagement torque of low value, clutch teeth on the drive member, a clutch member journalled on the driven member, clutch teeth on the clutch member adapted to cooperate with the clutch teeth on the drive member, sloping clutch teeth on the back of the clutch member, an abutment on the driven member, a second spring interposed between the abutment and the sloping teeth to provide for jump engagement of the clutch member with the second spring and to urge the clutch member against the collar, and means fixedly engaging one end of the second spring with the driven member, the second spring being of greater compressive strength than said first spring, the second spring having a predetermined length so that when the driven member is moved inwardly the other end of the second spring exerts a force against said sloping clutch teeth thereby axially moving the clutch member against the engaging force of the first spring in order that the cooperating clutch teeth of the clutch member and drive member become engaged thereby a jump engagement being provided between said other end of the second spring and the sloping clutch teeth on the back of the clutch member providing a screw-in torque releasable at a higher value than said screw-slot engagement torque provided by the sloping clutch teeth jumping on the second spring, the second spring being ineffective against the clutch member when the driven member is moved outwardly thereby allowing the first spring to disengage the teeth on the drive and clutch members.

4. A tool comprising a housing, a drive member, an axially movable tool holding driven member movable inwardly and outwardly of the housing, a collar at the end of the driven member adjacent the drive member, a clutch member freely mounted on the driven member, a first spring interposed between the drive member and the collar urging the driven member outwardly providing driving action therebetween and adapted to slip for a torque load above a predetermined value thereby providing a screw-slot engagement torque of low value, a clutch surface on the drive member, a first clutch surface on the clutch member adapted to cooperate with the clutch surface on the drive member, a second clutch surface on the back of the clutch member, an abutment on the driven member, a second spring interposed between the abutment and the clutch member second clutch surface to provide for jump engagement of the clutch member with the second spring and to urge the clutch member against the collar, means fixedly engaging one end of the second spring with the driven member, the second spring being of greater compressive strength than said first spring, the second spring having a predetermined length so that when the driven member is moved inwardly the other end of the second spring exerts a force against said clutch member second clutch surface thereby axially moving the clutch member against the engaging force of the first spring in order that the cooperating clutch surfaces of the clutch member and drive member become engaged thereby providing a screw-in torque releasable at a higher value than said screw-slot engagement torque provided by the clutch member second clutch surface jumping on the second spring, the second spring being ineffective against the clutch member when the driven member is moved outwardly thereby allowing the first spring to release the engagement of the clutch surface on the drive member with the first clutch surface on the clutch member, a clamping collet journalled on the driven shaft about its tool hold end, a collet spring tending to urge the clamping collet upwardly from the tool holding end, and a manually operative spring member abutting against the upward end of the clamping collet movable to urge the collet downwardly against the action of its spring.

5. A tool comprising a housing, a drive member, an axially movable tool holding driven member movable inwardly and outwardly of the housing, a first collar at the end of the driven member adjacent the drive member, a clutch member freely mounted on said driven member, a first spring interposed between the drive member and the first collar urging the driven member outwardly providing driving action therebetween and adapted to slip for a torque load above a predetermined value thereby providing a screw-slot engagement torque of low value, a clutch surface on the drive member, a first clutch surface on the clutch member adapted to cooperate with the clutch surface on the drive member, a second clutch surface on the back of the clutch member, an abutment on the driven member, a second spring interposed between the abutment and the clutch member second clutch surface to provide jump engagement of the clutch member with the second spring and to urge the clutch member against the first collar, means fixedly engaging one end of the second spring with the driven member, the second spring being of greater compressive strength than said first spring, the second spring having a predetermined length so that when the driven member is moved inwardly the other end of the second spring exerts a force against said clutch member second clutch surface thereby axially moving the clutch member against the engaging force of the first spring in order that the cooperating clutch surfaces of the clutch member and drive member become engaged thereby providing a screw-in torque releasable at a higher value than said screw-slot engagement torque provided by the clutch member second clutch surface jumping on the second spring, the second spring being ineffective against the clutch member when the driven member is moved outwardly thereby allowing the first spring to release the engagement of the clutch surface on the drive member with the first clutch surface on the clutch member, and a clamping collet journalled on the driven shaft about its tool holding end, a collet spring tending to urge the clamping collet upwardly, a second collar fixedly attached to the tool holding driven member, and a spring urged disc positioned about the tool holding member under said second collar.

References Cited by the Examiner

UNITED STATES PATENTS

| | | | |
|---|---|---|---|
| 1,167,285 | 1/16 | Flogland | 64—29 |
| 1,564,342 | 12/25 | Gebhardt et al. | |
| 1,855,456 | 4/32 | Miller | 81—52.4 X |
| 2,111,280 | 3/38 | Connell | 144—32 X |
| 2,272,279 | 2/42 | Schindel | 144—32 |
| 2,633,923 | 4/53 | Hartz | 64—30 |
| 2,690,090 | 9/54 | Pedersen | 81—52.4 |
| 2,743,636 | 5/56 | Shaff | 81—52.4 |
| 2,796,161 | 6/57 | Graybill | 144—32 X |
| 3,005,325 | 10/61 | Eckman | 64—29 |

WILLIAM W. DYER, Jr., *Primary Examiner.*

WALTER A. SCHELL, DONALD R. SCHRAN,
*Examiners.*